(12) United States Patent
Aitken et al.

(10) Patent No.: US 7,754,629 B2
(45) Date of Patent: Jul. 13, 2010

(54) PHOSPHOTELLURITE-CONTAINING GLASSES, PROCESS FOR MAKING SAME AND ARTICLES COMPRISING SAME

(75) Inventors: Bruce Gardiner Aitken, Corning, NY (US); James Edward Dickinson, Jr., Corning, NY (US); Sinue Gomez, Corning, NY (US)

(73) Assignee: Corning Incorporated, Corning, NY (US)

( * ) Notice: Subject to any disclaimer, the term of this patent is extended or adjusted under 35 U.S.C. 154(b) by 636 days.

(21) Appl. No.: 11/703,363

(22) Filed: Feb. 7, 2007

(65) Prior Publication Data

US 2008/0132399 A1 Jun. 5, 2008

Related U.S. Application Data

(60) Provisional application No. 60/872,024, filed on Nov. 30, 2006.

(51) Int. Cl.
*C03C 3/16* (2006.01)
*C03C 3/12* (2006.01)

(52) U.S. Cl. .............................. 501/45; 501/41; 501/47; 501/48

(58) Field of Classification Search .................. 501/41, 501/45, 47, 48
See application file for complete search history.

(56) References Cited

U.S. PATENT DOCUMENTS

| | | | |
|---|---|---|---|
| 5,153,151 A | 10/1992 | Aitken | 501/45 |
| 6,194,334 B1 * | 2/2001 | Aitken et al. | 501/41 |
| 6,352,950 B1 * | 3/2002 | Aitken et al. | 501/37 |
| 6,656,859 B2 | 12/2003 | Aitken et al. | 501/41 |
| 7,033,966 B2 * | 4/2006 | Kobayashi et al. | 501/41 |
| 2004/0235634 A1 * | 11/2004 | Kobayashi et al. | 501/41 |

FOREIGN PATENT DOCUMENTS

| | | | |
|---|---|---|---|
| DE | 2160910 | | 6/1972 |
| JP | 62128946 A | * | 6/1987 |
| JP | 07126037 A | * | 5/1995 |
| JP | 2000272933 A | * | 10/2000 |
| JP | 2001064036 A | * | 3/2001 |
| JP | 2006342044 A | * | 12/2006 |
| WO | WO 2008050591 A1 | * | 5/2008 |
| WO | WO 2008050819 A1 | * | 5/2008 |

OTHER PUBLICATIONS

H Bürger, K-G Fink, W Vogel, V Kozhukharov, M Marinov, Glastech. Ber. 58 (1985) 211-219.
Abstract of DE3125299; Publication date: May 6, 1982; Country of Germany.

* cited by examiner

*Primary Examiner*—Karl E Group
*Assistant Examiner*—Elizabeth A Bolden
(74) *Attorney, Agent, or Firm*—Robert P. Santandrea; Siwen Chen

(57) ABSTRACT

Disclosed are glass materials generally belonging to the $P_2O_5$—ZnO—$TeO_2$ system and process for making the same. The glass may comprise $Bi_2O_3$ as well. The high refractive index and low $T_g$ materials are particularly suitable for refractive lens elements for use in portable optical devices. The process involves the use of $P_2O_5$ source materials with reduced amounts of reducing agents or a step of removing the reducing agents from such source materials by an oxidizing step such as calcination.

22 Claims, 5 Drawing Sheets

$x$Na$_2$O·(30-$x$)BaO·30P$_2$O$_5$·40TeO$_2$

PHOSPHOTELLURITE-CONTAINING GLASSES, PROCESS FOR MAKING SAME AND ARTICLES COMPRISING SAME

CROSS-REFERENCE TO RELATED APPLICATIONS

The present application claims the benefit of the earlier filing date of U.S. Provisional Patent Application Ser. No. 60/872,024, filed on Nov. 30, 2006, entitled "PHOSPHOTELLURITE-CONTAINING GLASSES, PROCESS FOR MAKING SAME AND ARTICLES COMPRISING SAME," the content of which is relied upon and incorporated herein by reference in its entirety.

FIELD OF THE INVENTION

The present invention relates to $P_2O_5$— and $TeO_2$-containing high-index glass, process of making the same, and articles comprising the same. In particular, the present invention relates to moldable $P_2O_5$— and $TeO_2$-containing glass having a $T_g$ lower than about 400° C. and a refractive index of at least 1.70 at 633 nm. The present invention is useful, for example, in making high-index refractive optical elements for use in optical devices such as cameras.

BACKGROUND OF THE INVENTION

Materials having high refractive index (at least 1.70) in the visible spectrum are highly desired for many optical devices such as cameras, projectors, and the like. Optical elements made with high refractive indexes can be made to have higher corrective or manipulative power at a defined geometry of the lens. Therefore, refractive lenses used in optical systems can be made thinner and smaller with high-index materials. Compactness of such lenses is especially important for portable electronics such as camera phones and ultra-compact digital cameras. Various organic and inorganic high-index materials are available commercially. For example, pure $TeO_2$ glass is known to have an index of about 2.10 at 633 nm. High index thermosetting polymers with a refractive index of 1.76 in the visible range were recently announced by Nitto Denko Corporation of Japan. However, these materials are either difficult to process, or too costly to be used in large-scale industrial production of consumer products.

High-index $Sb_2O_3$—$P_2O_5$ glasses were proposed in the prior art previously for use in optical systems. U.S. Pat. No. 5,153,151 describes moldable high-index $Sb_2O_3$—$P_2O_5$ glasses that could be used in the production of optical lenses. In order to achieve a refractive index on the order of 1.80 with this material, it was necessary to employ $Sb_2O_3$ with a content up to about 40 mol % or on the order of 65 wt %. There are concerns that pyrophosphate glasses with such high $Sb_2O_3$ levels may not have sufficient chemical durability for the desired applications. Therefore, alternative materials with comparable optical and forming characteristics but with improved water/humidity resistance are sought.

The present invention satisfies the need of such alternative high-index moldable glass.

SUMMARY OF THE INVENTION

A first aspect of the present invention is a glass material having a refractive index higher than about 1.70 at 633 nm, in certain embodiments higher than about 1.75, in certain other embodiments higher than about 1.80, in certain other embodiments higher than about 1.85, in certain other embodiments higher than about 1.90, having a composition, expressed in mole percentage of the total composition on an oxide basis, comprising:

20-90% $TeO_2$, in certain embodiments desirably 25-70%, in certain other embodiments desirably 30-65%;

1-40% $P_2O_5$, in certain embodiments desirably 5-25%;

1-30% $R_2O$, in certain embodiments desirably 1-25%, in certain embodiments desirably 1-10%, in certain other embodiments 5-25%, where $R_2O$ represents all alkali metal oxides in total;

0-30% RO, in certain embodiments desirably 0-20%, where RO represents all alkaline earth metal oxides in total;

5-40% ZnO, in certain embodiments desirably 10-35%;

0-15% $Bi_2O_3$, in certain embodiments desirably 0-10%, in certain other embodiments desirably 0-8%;

0-5% $Al_2O_3$, in certain embodiments desirably 0-3%, in certain other embodiments desirably 0.5-5%, in certain other embodiments desirably 0.5-3%;

0-5% $Ga_2O_3$, in certain embodiments desirably 0-3%, in certain other embodiments desirably 0.5-5%, in certain other embodiments desirably 0.5-3%; 0-10% $B_2O_3$, in certain embodiments desirably 0-5%;

0-15% $R'_2O_3$, in certain embodiments desirably 0-10%, where $R'_2O_3$ represents $Al_2O_3$, $Bi_2O_3$ and $Ga_2O_3$ in total;

0-5% $Ln_2O_3$, in certain embodiments desirably 0-2%, where Ln is any metal selected from the group consisting of lanthanoids, Y and Sc;

0-20% PbO, in certain embodiments desirably 0-15%, in certain other embodiments desirably essentially zero;

0-20% $Tl_2O$, in certain embodiments desirably 0-15%, in certain other embodiments desirably essentially zero; and 0-30% CdO, in certain embodiments desirably 0-10%; in certain other embodiments desirably essentially zero.

In certain embodiments, the glass material of the present invention is essentially free of $Bi_2O_3$ and comprises about 0.5-3% $Al_2O_3$ and $Ga_2O_3$.

In certain embodiments, the glass material of the present invention is essentially free of $Bi_2O_3$ and comprises about 0.5-3% $Al_2O_3$.

In certain embodiments, the glass material of the present invention comprises about 0.5-5% by mole of $Bi_2O_3$, in certain embodiments 0.5-3%. In certain embodiments, the glass material is essentially free of $Al_2O_3$ and $Ga_2O_3$ and comprises 0.5-5% by mole of $Bi_2O_3$, in certain embodiments 0.5-3%.

In certain embodiments, the glass material of the present invention is essentially free of metallic Te.

In certain embodiments, the glass material of the present invention is essentially free of metallic Bi.

In certain embodiments, the glass material of the present invention is essentially colorless.

In certain embodiments, the glass material of the present invention is essentially free of $Li_2O$.

In certain embodiments, the glass material of the present invention comprises at least 1% by mole of $Li_2O$, in addition to and in combination with $Na_2O$ and/or $K_2O$. In certain embodiments, the glass material of the present invention comprises 1-3% of $Li_2O$. In certain embodiments, the glass material of the present invention comprises 1-3% of $Li_2O$ and at least 1% by mole of $Na_2O$ and/or $K_2O$. In certain embodiments, the glass material of the present invention comprises 1-3% of $Li_2O$ and 1-10% by mole of $Na_2O$ and/or $K_2O$.

In certain embodiments, the glass material of the present invention has essentially no absorption band in the wavelength range of 420-650 nm. In certain embodiments, the glass material of the present invention has an average transmission in the visible range of at least 80%/mm, and a variation of transmission in the visible range of less than about 10%, in certain embodiments less than about 5%.

In certain embodiments, the glass material of the present invention has a glass transition temperature ($T_g$) of lower than about 450° C., in certain embodiments lower than about 400° C., in certain embodiments lower than about 380° C.

In certain embodiments of the glass material of the present invention, the metallic elements are essentially at the highest valency thereof.

In certain embodiments, the glass material of the present invention has a water durability of less than 0.5% weight loss.

In certain embodiments, the glass material of the present invention is essentially free of PbO and CdO.

In certain embodiments, the glass material of the present invention has a composition, expressed in terms of weight percentage of the total composition on an oxide basis, consisting essentially of: 25-70% $TeO_2$; 5-25% $P_2O_5$; 1-25% $R_2O$; 0-20% RO, where RO represents all alkaline earth metal oxides in total; 10-35% ZnO; 0-10% $Bi_2O_3$; 0-3% $Al_2O_3$; 0-3% $Ga_2O_3$; 0-10% $R_2O_3$, where $R_2O_3$ represents $Al_2O_3$, $Bi_2O_3$ and $Ga_2O_3$ in total; 0-2% $Ln_2O_3$, in certain embodiments desirably 0-2%, where Ln is any metal selected from the group consisting of lanthanoids, Y and Sc; and essentially free of PbO, CdO and $Tl_2O$.

A second aspect of the present invention is a process for making a glass comprising $TeO_2$ and $P_2O_5$, wherein:

the source material of $P_2O_5$ in the batch is selected from: (i) $H_3PO_4$, $H_4P_2O_7$, $P_2O_5$, metal phosphates, (ii) solutions and/or dispersions of those listed in (i); and (iii) mixtures and combinations of those listed in (i) and (ii); and the batch materials are selected such that upon melting, the glass has a refractive index higher than about 1.70 at 633 nm (in certain embodiments higher than about 1.75, in certain other embodiments higher than about 1.80, in certain other embodiments higher than about 1.85, in certain other embodiments higher than about 1.90), and a composition, expressed in mole percentage of the total composition on an oxide basis, comprising:

20-90% $TeO_2$, in certain embodiments desirably 25-70%, in certain other embodiments desirably 30-65%;

1-40% $P_2O_5$, in certain embodiments desirably 5-25%;

1-30% $R_2O$, in certain embodiments desirably 1-25%, in certain embodiments desirably 1-10%, in certain other embodiments 5-25%, where $R_2O$ represents all alkali metal oxides in total;

0-30% RO, in certain embodiments desirably 0-20%, where RO represents all alkaline earth metal oxides in total;

5-40% ZnO, in certain embodiments desirably 10-35%;

0-15% $Bi_2O_3$, in certain embodiments desirably 0-10%, in certain other embodiments desirably 0-8%;

0-5% $Al_2O_3$, in certain embodiments desirably 0-3%, in certain other embodiments desirably 0.5-5%, in certain other embodiments desirably 0.5-3%;

0-5% $Ga_2O_3$, in certain embodiments desirably 0-3%, in certain other embodiments desirably 0.5-5%, in certain other embodiments desirably 0.5-3%; 0-10% $B_2O_3$, in certain embodiments desirably 0-5%;

0-15% $R_2O_3$, in certain embodiments desirably 0-10%, where $R_2O_3$ represents $Al_2O_3$, $Bi_2O_3$ and $Ga_2O_3$ in total;

0-5% $Ln_2O_3$, in certain embodiments desirably 0-2%, where Ln is any metal selected from the group consisting of lanthanoids, Y and Sc;

0-20% PbO, in certain embodiments desirably 0-15%, in certain other embodiments desirably essentially zero;

0-20% $Tl_2O$, in certain embodiments desirably 0-15%, in certain other embodiments desirably essentially zero; and 0-30% CdO, in certain embodiments desirably 0-10%; in certain other embodiments desirably essentially zero.

In certain embodiments of the process of the present invention, the batch material is chosen such that upon melting, the resulting glass is essentially free of $Bi_2O_3$ and comprises about 0.5-3% $Al_2O_3$ and/or $Ga_2O_3$.

In certain embodiments of the process of the present invention, the batch material is chosen such that upon melting, the resulting glass is essentially free of $Bi_2O_3$ and comprises about 0.5-3% $Al_2O_3$.

In certain embodiments of the process of the present invention, the batch material is chosen such that upon melting, the resulting glass comprises about 0.5-5% of $Bi_2O_3$, in certain embodiments about 0.5-3%. In certain embodiments of the process of the present invention, the batch is chosen such that upon melting, the resulting glass is essentially free of $Al_2O_3$ and $Ga_2O_3$ and comprises 0.5-5%, in certain embodiments 0.5-3% of $Bi_2O_3$.

In certain embodiments of the process of the present invention, the batch material is chosen such that upon melting, the resulting glass material of the present invention comprises at least 1% by mole of $Li_2O$. In certain embodiments, the glass material resulting from the process of the present invention comprises 1-3% of $Li_2O$. In certain embodiments, the glass material resulting from the process of the present invention comprises 1-3% of $Li_2O$ and at least 1% by mole of $Na_2O$ and/or $K_2O$. In certain embodiments, the glass material resulting from the process of the present invention comprises 1-3% of $Li_2O$ and 1-10% by mole of $Na_2O$ and/or $K_2O$. In certain embodiments, the glass material resulting from the process of the present invention comprises 1-3% of $Li_2O$ and 1-5% by mole of $Na_2O$ and/or $K_2O$.

In certain embodiments of the process of the present invention, the batch material is chosen such that upon melting, the resulting glass is essentially free of $Li_2O$. In certain embodiments of the process of the present invention, the source material of $P_2O_5$ in the batch is essentially free of reducing impurities.

In certain embodiments, the process of the present invention comprises a step of calcining the solid source material of $P_2O_5$ in the batch at an elevated temperature before mixing such material with the rest of the batch material. In certain embodiments of the process of the present invention, the $P_2O_5$ source material in the batch is selected from $H_3PO_4$, $H_4P_2O_7$, mixtures, solutions and dispersions thereof.

In certain embodiments of the process of the present invention, an oxidizing agent is introduced into the batch material. In certain embodiments of such processes of the present invention, the oxidizing agent is selected from nitrates, peroxides, hypochlorites, chlorates, perchlorates, persulfates, oxidizing gases, and combinations and mixtures thereof.

In certain embodiments of the process of the present invention, the batch material is chosen such that upon melting, the resulting glass is essentially free of PbO and CdO.

A third aspect of the present invention is a glass article comprising a glass material having a refractive index higher than about 1.70 at 633 nm (in certain embodiments higher than about 1.75, in certain other embodiments higher than about 1.80, in certain other embodiments higher than about 1.85, in certain other embodiments higher than about 1.90), having a composition, expressed in mole percentage of the total composition on an oxide basis, comprising:

20-90% $TeO_2$, in certain embodiments desirably 25-70%, in certain other embodiments desirably 30-65%;

1-40% $P_2O_5$, in certain embodiments desirably 5-25%;

1-30% $R_2O$, in certain embodiments desirably 1-25%, in certain embodiments desirably 1-10%, in certain other embodiments 5-25%, where $R_2O$ represents all alkali metal oxides in total;

0-30% RO, in certain embodiments desirably 0-20%, where RO represents all alkaline earth metal oxides in total;

5-40% ZnO, in certain embodiments desirably 10-35%;

0-15% $Bi_2O_3$, in certain embodiments desirably 0-10%, in certain other embodiments desirably 0-8%;

0-5% $Al_2O_3$, in certain embodiments desirably 0-3%, in certain other embodiments desirably 0.5-5%, in certain other embodiments desirably 0.5-3%;

0-5% $Ga_2O_3$, in certain embodiments desirably 0-3%, in certain other embodiments desirably 0.5-5%, in certain other embodiments desirably 0.5-3%; 0-10% $B_2O_3$, in certain embodiments desirably 0-5%;

0-15% $R_2O_3$, in certain embodiments desirably 0-10%, where $R_2O_3$ represents $Al_2O_3$, $Bi_2O_3$ and $Ga_2O_3$ in total;

0-5% $Ln_2O_3$, in certain embodiments desirably 0-2%, where Ln is any metal selected from the group consisting of lanthanoids, Y and Sc;

0-20% PbO, in certain embodiments desirably 0-15%, in certain other embodiments desirably essentially zero;

0-20% $Tl_2O$, in certain embodiments desirably 0-15%, in certain other embodiments desirably essentially zero; and 0-30% CdO, in certain embodiments desirably 0-10%; in certain other embodiments desirably essentially zero.

According to certain embodiments, the glass articles of the present invention are refractive lens element for use in optical devices. Certain embodiments of such refractive lens elements are aspherical, and certain others are spherical.

According to certain embodiments, the glass articles of the present invention are made from glass having a $T_g$ lower than about 450° C., in certain embodiments lower than about 400° C., in certain other embodiments lower than about 380° C.

According to certain embodiments, the glass articles of the present invention are made by pressing or molding.

The present invention has the following advantages. First, the glass can be made to have a very high refractive index of even higher than about 1.80, which is highly desirable for portable opto-electric devices such as portable digital camera and camera phones. Second, the glass, due to the low $T_g$, can be pressed into net shape at low temperature, thereby extending the mold life time, simplifying the manufacture process of lenses with complex surface profile, such as aspherical lenses. Third, by careful choice of composition, the glass can have very high water durability.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION OF THE INVENTION

Figure 1:
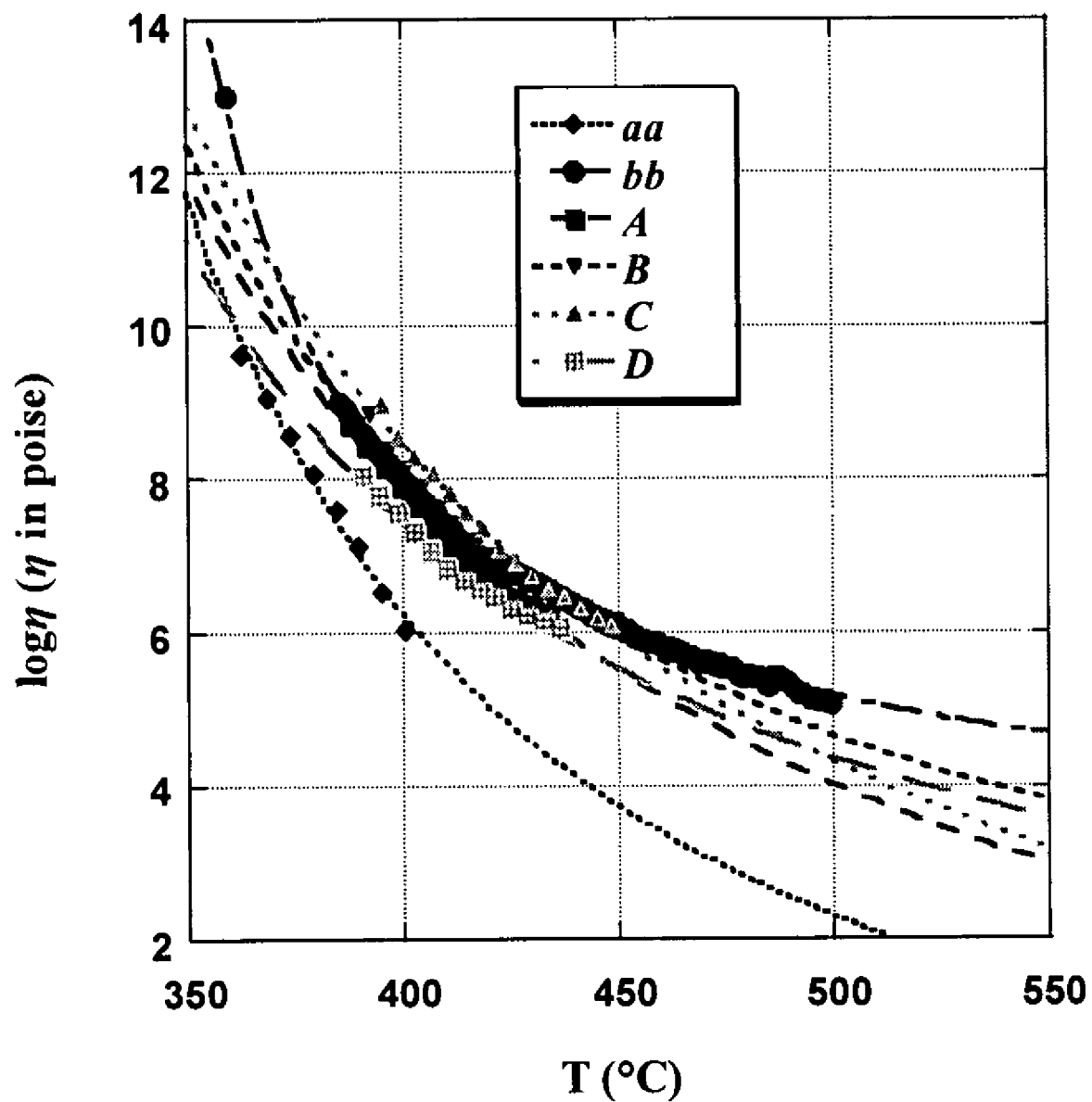
FIG. 1 is a diagram showing the viscosity curve as a function of temperature of a series of $P_2O_5$— and $TeO_2$-containing glasses.

In the present application, All percentages of the components of the glass are by mole unless specified otherwise. The mole percentages of oxides in a glass composition are those expressed in terms of the identified oxide, regardless of the valency of the metals in the composition. For example, the amount of Fe in the glass composition is calculated in terms of $Fe_2O_3$, even though Fe in the glass may be present in $Fe^{2+}$ and $Fe^{3+}$ state. For another example, the amount of Te in the glass composition is calculated in terms of $TeO_2$, even though Te in the glass may be present in $Te^0$ and $Te^{4+}$ state. For yet another example, the total amount of Bi in the glass is expressed in terms of $Bi_2O_3$, even though the glass may be present in the glass in the form of $Bi^{3+}$ and $Bi^0$. By "metallic state," it is meant that the relevant metal, or a part thereof, is at zero (0) valancy in the material.

As used herein, any general formula of $xXO.yYO.zZO$ means that the composition of the glass consists essentially of oxides XO, YO and ZO in molar ratio of x:y:z. For example, a glass system having a general formula of $xNa_2O.yBaO.zZnO.(60-x-y-z)P_2O_5.40TeO_2$ means that the glass consists essentially of $Na_2O$, BaO, ZnO, $P_2O_5$ and $TeO_2$ in molar ratio of x:y:z:(60-x-y-z):40. Again, the amount of X, Y, Z in the glass are calculated or expressed in the molar percentages of XO, YO and ZO, even through X, Y and Z may be present in multiple valency states.

By the term "consisting essentially of," it is meant that the material of the present invention may comprise components in addition to those listed, as long as those additional components, in their added amounts, do not alter the basic and novel feature of the present invention.

"The visible range" of the light spectrum, or "the visible spectrum," means the segment from 420 nm to 650 nm on the electromagnetic spectrum.

By "colorless," it is meant that the glass is essentially free of absorption peak in the visible range as defined herein. In certain embodiments, the glass of the present invention has a red shift of absorption edge of less than about 20 nm, in certain embodiments less than about 10 nm, in certain other embodiments less than 5 nm, compared to the absorption edge of a fully-oxidized glass having essentially the same composition. "Absorption edge" as used herein means the longest wavelength shorter than 700 nm at which the internal transmission of the glass is 50% of that at 700 nm. "Internal transmission" means the percentage of light transmitted at the specified wavelength per millimeter, with surface reflection loss corrected. "Fully oxidized" means the glass was subjected to oxidation of an oxidizing agent at a sufficient amount for an infinite period of time such that essentially all metals in the glass composition are oxidized to the highest possible valency in the glass under the melting conditions. Certain colorless glass of the present invention has an average transmission without surface loss correction of at least 80%, and a transmission variation, defined as the peak-to-valley transmission difference across the wavelength span from about 420 to about 650 nm, of less than or equal to about 8%. In certain embodiments, the transmission variation is less than or equal to 5%, in certain other embodiments, the transmission variation is less than or equal to 3%.

Pure $TeO_2$ glass has very high refractive index at about 633 nm: about 2.10. However, due to its high cost and poor processability, this material itself cannot be economically employed in mass production of lenses for consumer electronics such as camera phones, digital cameras, and the like.

Compositions that are intermediate between those of low index pyrophosphate glass (e.g., alkali Zn pyrophosphate) and $TeO_2$ or binary or more complex high index tellurite glasses are found to yield clear glasses with $T_g$ ranging from 320 to 350° C. and refractive index ranging from about 1.55 to at least 1.92. Glasses with $TeO_2$ concentrations of 40-50 mol % (or 50-60 wt %) have refractive index near 1.80 (See, FIG. 1). Although the endmember tellurite glasses have extremely steep viscosity curves, rendering them problematic for large scale forming operations, it was unexpectedly found that the intermediate composition phosphotellurite glasses are characterized by viscosity curves that essentially overly those of the relatively "long" or "strong" pyrophosphate glasses (see, FIG. 2).

FIG. 1 shows the dependence of viscosity (log η) for a typical tellurite glass ($20BaO.20ZnO.60TeO_2$, curve aa), a typical alkali zinc pyrophosphate glass ($20Na_2O.43ZnO.2Al_2O_3.35P_2O_5$, curve bb) and several phosphotellurite glasses (curves A, B, C and D). Note the similar dependence of the pyrophosphate and phosphotellurite glasses, especially at higher temperature in the forming range.

Figure 2:
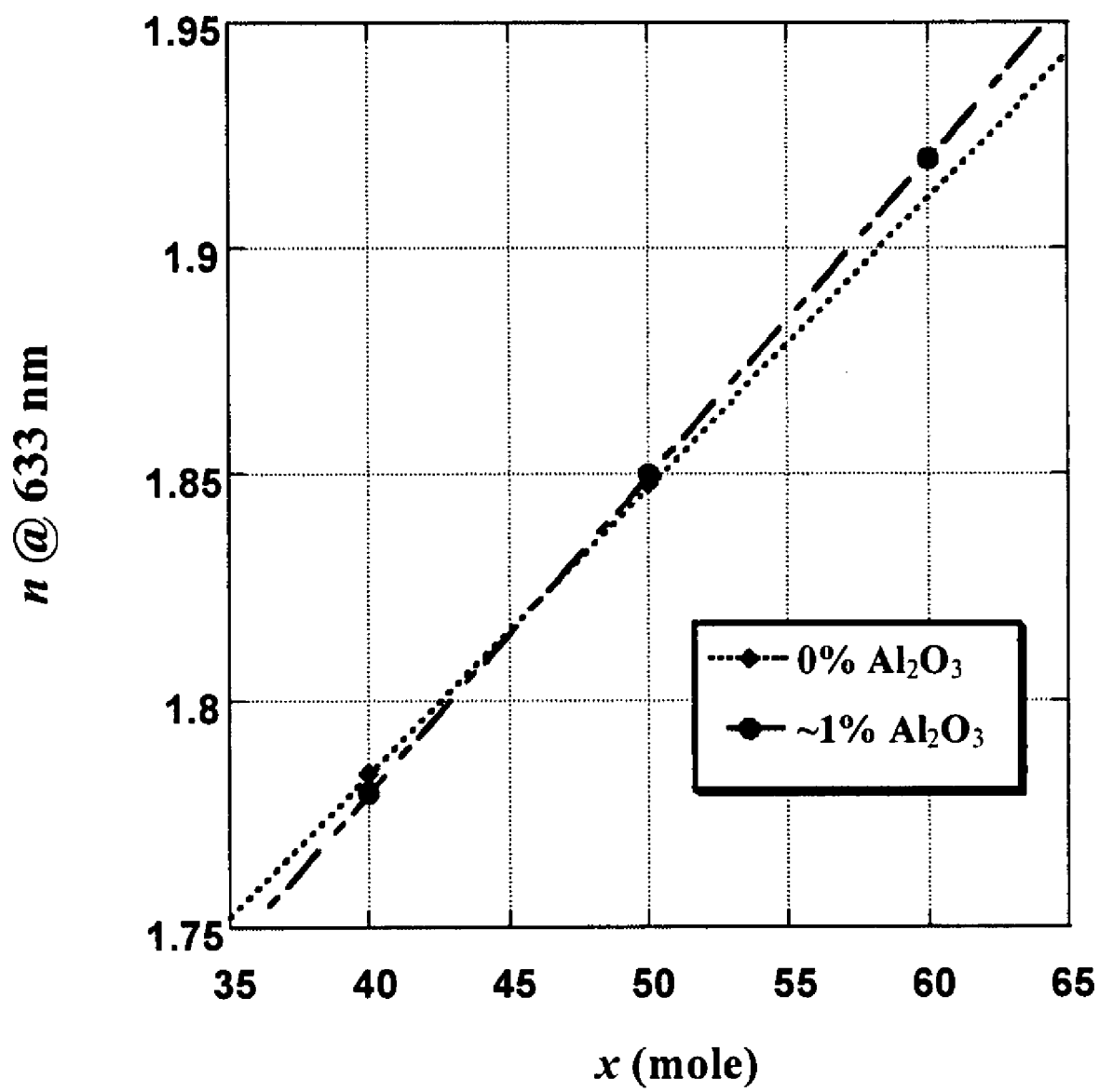
FIG. 2 is a diagram showing the weight loss of a series of $P_2O_5$— and $TeO_2$-containing glass having a general formula of $(100-x)(20Na_2O.46.7ZnO.33.3P_2O_5).xTeO_2$ as a function of the content of $TeO_2$ in the glass.

FIG. 2 shows the dependence of refractive index at 633 nm (n) on $TeO_2$ concentration for glasses intermediate in composition between $TeO_2$ and an alkali Zn pyrophosphate with and without $Al_2O_3$. Note that a refractive index of 1.80 can be achieved with glasses containing ~43% $TeO_2$.

Accordingly, the glass of the present invention, generally belonging to $TeO_2$—ZnO—$P_2O_5$ glass family, is invented to meet the needs of cost-effective moldable glass for use in, inter alia, digital cameras and camera phones. The glass of the present invention, in general terms, has a refractive index higher than about 1.70 at 633 nm, in certain embodiments higher than about 1.75, in certain other embodiments higher than about 1.80, in certain other embodiments higher than about 1.85, in certain other embodiments higher than about 1.90, and has a composition, expressed in mole percentage of the total composition on an oxide basis, comprising:

20-90% $TeO_2$, in certain embodiments desirably 25-70%, in certain other embodiments desirably 30-65%;

1-40% $P_2O_5$, in certain embodiments desirably 5-25%;

1-30% $R_2O$, in certain embodiments desirably 1-25%, in certain embodiments desirably 1-10%, in certain other embodiments 5-25%, where $R_2O$ represents all alkali metal oxides in total;

0-30% RO, in certain embodiments desirably 0-20%, where RO represents all alkaline earth metal oxides in total;

5-40% ZnO, in certain embodiments desirably 10-35%;

0-15% $Bi_2O_3$, in certain embodiments desirably 0-10%, in certain other embodiments desirably 0-8%;

0-5% $Al_2O_3$, in certain embodiments desirably 0-3%, in certain other embodiments desirably 0.5-5%, in certain other embodiments desirably 0.5-3%;

0-5% $Ga_2O_3$, in certain embodiments desirably 0-3%, in certain other embodiments desirably 0.5-5%, in certain other embodiments desirably 0.5-3%; 0-10% $B_2O_3$, in certain embodiments desirably 0-5%;

0-15% $R_2O_3$, in certain embodiments desirably 0-10%, where $R_2O_3$ represents $Al_2O_3$, $Bi_2O_3$ and $Ga_2O_3$ in total;

0-5% $Ln_2O_3$, in certain embodiments desirably 0-2%, where Ln is any metal selected from the group consisting of lanthanoids, Y and Sc;

0-20% PbO, in certain embodiments desirably 0-15%, in certain other embodiments desirably essentially zero;

0-20% $Tl_2O$, in certain embodiments desirably 0-15%, in certain other embodiments desirably essentially zero; and 0-30% CdO, in certain embodiments desirably 0-10%; in certain other embodiments desirably essentially zero.

$TeO_2$ is the main component for imparting the desired high refractive index of the glass. It is comprised at least 20% by mole. Typically, assuming the composition of the balance of the glass composition remains the same, the higher the mole percentage of $TeO_2$ in the glass, the higher the refractive index of the glass. However, as mentioned above, pure $TeO_2$ glass is costly and difficult to vitrify due to its high crystallization tendency. Therefore, 90% by mole is the practical maximal limit for its content in the glass. In order to obtain a good balance of the refractive index, $T_g$ and cost, it is desired in certain embodiments that the glass comprises 25-70% by mole of $TeO_2$, in certain embodiments 30-65%.

$TeO_2$ is easy to be reduced into metallic Te in the form of metal colloid or crystals in the glass under normal glass melting conditions, especially in the presence of $P_2O_5$ in the glass network. Without intending to be bound by any particular theory, it is believed that the presence of metallic Te in the glass can lead to red-shift of the absorption edge of the glass, can lead the absorption edge into ht visible, resulting in a brownish tint of the glass. This means that compared to ideal $P_2O_5$— and $TeO_2$-containing glass completely free of metallic Te, the absorption edge of a glass melted from the same batch materials but containing Te meal tends to shift to longer wavelength—the red end of the visible light spectrum. In certain embodiments, it is highly desired that the glass of the present invention does not have absorption peak in the visible range. In certain embodiments, it is highly desired that the glass has a red shift of absorption edge of less than about 20 nm, in certain other embodiments less than about 15 nm, in certain other embodiments less than about 10 nm. To prevent red-shift of absorption edge, it is generally desired that the glass of the present invention is essentially free of metallic Te. A $P_2O_5$— and $TeO_2$-containing glass of the present invention essentially free of metallic Te or other metals is typically colorless to the naked eyes of the human being. Consequently, it is desired that essentially all Te present in the glass of the present invention is at +4 valency, its highest valency. Glass comprising metallic Te can display a pale yellow to pale brown to dark brown coloration due to its absorption in the blue range of the visible spectrum.

$P_2O_5$ is a glass former. The inclusion of $P_2O_5$ in the glass reduces the cost and the variation of the viscosity with temperature, resulting in improved hot glass forming characteristics. However, if $P_2O_5$ content is too high, the glass can have undesirably low water durability. Therefore, $P_2O_5$ is typically required to be between 1-40%, in certain embodiments 5-25% by mole.

$R_2O$, including $Li_2O$, $Na_2O$, $K_2O$, $Rb_2O$ and $Cs_2O$ and combinations and mixtures thereof, are included in the glass to reduce the $T_g$. Typically, the higher the amount of the total $R_2O$, the lower the $T_g$ of the glass. However, if $R_2O$ is included at too high a content, the water durability of the glass suffers. Thus, typically, $R_2O$ is included at a level between 1-30% by mole, in certain embodiments desirably 1-25%, in certain embodiments desirably 1-10%, in certain embodiments between 5-25%. It has been found that, when both $P_2O_5$ and $R_2O$ are used at very high amounts, the glass can be hygroscopic, which is highly undesirable. It has been found that: (i) the effect of $Na_2O$ and $K_2O$ on the water durability of the glass is similar; (ii) when $Li_2O$ is used alone at above 5%, the glass tends to crystallize; and (iii) if $Li_2O$ is used in conjunction with $Na_2O$, $K_2O$ or both, the water durability of the glass tends to be better. Therefore, in certain embodiments, it is desired that the glass of the present invention comprises $Li_2O$ at higher than about 1%. In certain embodiments, the glass material of the present invention comprises at least 1% by mole of $Li_2O$, in addition to and in combination with $Na_2O$ and/or $K_2O$. In certain embodiments, the glass material of the present invention comprises 1-3% of $Li_2O$. In certain embodiments, the glass material of the present invention comprises 1-3% of $Li_2O$ and at least 1% by mole of $Na_2O$ and/or $K_2O$. In certain embodiments, the glass material of the present invention comprises 1-3% of $Li_2O$ and 1-10% by mole of $Na_2O$ and/or $K_2O$. In certain embodiments, the glass material of the present invention comprises 1-3% of $Li_2O$ and 1-5% of $Na_2O$ and/or $K_2O$.

ZnO is essential for the glass of the present invention. It acts as a glass structure modifier. It is used between 5-40% by mole, in certain embodiments between 10-35% by mole. The amount of ZnO can be adjusted to fine-tune the $T_g$ and/or water durability of the glass.

RO as used herein refers to any and all alkaline earth metal oxides in the glass, including MgO, CaO, SrO and BaO. Among all alkaline earth metal oxides, BaO is especially conducive to high index of the glass. It has been found that the effect of SrO and BaO on the $T_g$ and water durability of the glass is similar. RO can be used in place of the part of the ZnO and/or $R_2O$ in the glass. Typically, RO is included between 0-30% by mole, in certain embodiments between 0-20% by mole.

$Bi_2O_3$ can be included in the glass of the present invention to replace part of the $TeO_2$ content in order to reduce the total cost without significantly reduce the overall glass index. Other metal oxides, such as CdO and PbO are known to impart beneficial effect on the refractive index of the glass, yet they are less desirable than $Bi_2O_3$ because of the much higher bio-toxicity and environment concerns. $Bi_2O_3$ can contribute to a good water durability of the glass as well. Typically, $Bi_2O_3$ is included between 0-15% by mole, in certain embodiments preferably 0-8% by mole. If a glass does not include $Al_2O_3$ or $Ga_2O_3$, it is typically desired that the glass comprises $Bi_2O_3$ of at least 3%. In certain embodiments, the glass is essentially free of $Al_2O_3$ and $Ga_2O_3$ and comprises 3-15% of $Bi_2O_3$, in certain embodiments 5-12%.

Similar to $TeO_2$, $Bi_2O_3$ is prone to be reduced to metal colloids in an inorganic glass under normal glass melting conditions and impart coloration and red shift of the absorption edge to the glass. Therefore, it is highly desired that $Bi_2O_3$ is not reduced to metallic state in the glass and Bi is essentially at +3 valency.

$Al_2O_3$, $Bi_2O_3$ and $Ga_2O_3$, if included, they can contribute to the water durability of the glass. However, if $Al_2O_3$ is included at higher than about 5% by mole, the glass batch would be difficult to melt at a temperature below about 1000° C., which can be undesirable. Thus, it is typically desired that the sum total of $Al_2O_3$, $Ga_2O_3$ and $Bi_2O_3$ is between 0-15% by mole. In certain embodiments, it is desired that the glass comprises 0.5-3% by mole of $Al_2O_3$. In certain other embodiments, it is desired that the glass comprises 0.5-3% by mole of $Ga_2O_3$.

The glass of the present invention may further comprise lanthanoids, $Y_2O_3$ and $Sc_2O_3$ (collectively, "$Ln_2O_3$") at 0-5% by mole each. These oxides are known to impart a high refractive index to glasses without $TeO_2$ and $Bi_2O_3$. Thus, for the glasses of the present invention, if $TeO_2$ and $Bi_2O_3$ amounts are held constant, including $Ln_2O_3$ in place of other components can lead to a higher refractive index of the glass. However, to obtain a colorless glass in the visible spectrum, oxides known to have absorption peaks in the visible, such as $Nd_2O_3$, $Er_2O_3$, and the like, should be avoided. Moreover, including $Ln_2O_3$ at too high a content can lead to devitrification and crystallization problems of the glass.

Heavy metal oxides such as CdO, PbO and $Tl_2O$ are known to be beneficial for a high refractive index if included in a glass composition. However, these three are all highly toxic materials, and thus should be avoided if toxicity and environmental safety are of concern. Typically, PbO is included between 0-20% by mole, in certain embodiments 0-15% by mole, in certain embodiments essentially zero. Typically, CdO is included between 0-30% by mole, in certain embodiments 0-10% by mole, in certain embodiments essentially zero. Typically, $Tl_2O$ is included between 0-20% by mole, in certain embodiments 0-10% by mole.

Thus, when all the above factors are taken into consideration, according to certain embodiments of the $Bi_2O_3$-containing glass of the present invention, the glass desirably comprises about 3-15% by mole of $Bi_2O_3$, and 0.5-3% by mole of $Al_2O_3$ and/or $Ga_2O_3$, with a total of $Bi_2O_3$, $Al_2O_3$ and $Ga_2O_3$ below about 15% by mole.

The glass of the present invention can be made by using conventional glass melting process and equipment. All batch materials, used in amounts calculated from the desired final composition of the glass, are processed, mixed and subjected to heating to an elevated temperature (such as around 1000° C.) in a vessel (such as a glass melting tank, a crucible, and the like), where the batch materials disintegrates, reacts and form a fluid glass melt. The glass melt is fined, allowed to cool down to room temperature, and then annealed. The glass may be annealed during the cooling cycle from the melt. The glass may be formed during the melting process or during the cooling cycle to near-net shape or net shape of a desired article. The thus formed glass can be further subjected to additional processing steps: cutting; grinding; polishing; thermal treatment (heating and/or cooling); surface coating; and ion bath treatment, and the like.

As mentioned supra, under normal glass melting conditions, $TeO_2$ and $Bi_2O_3$ are prone to be reduced to metallic state and impart undesirable coloration and red shift of absorption edge. The metallic Te and Bi present in the glass may take the form of colloid, crystals and combinations and mixtures thereof. Such coloration has been observed by the present inventors during the process of melting and preparing $P_2O_5$— and $TeO_2$-containing glass, and is further observed in the process of melting and preparing $P_2O_5$— and $TeO_2$-containing and $Bi_2O_3$-containing glass. Without intending to be bound by any particular theory, the present inventors believe that such reduction of $TeO_2$ and/or $Bi_2O_3$ in the glass-melting process, and hence the imparted coloration, are caused by the presence of reducing agents in the typically used batch materials, especially $Zn_2P_2O_7$ and $Zn_3(PO_4)_2$. Accordingly, to prepare a glass essentially free of metallic Te and/or Bi, or other metals at metallic state, the present inventors contemplated and implemented the following approaches: (i) minimizing the amount of or eliminating the presence of reducing agents in the batch materials; and (ii) including or introducing oxidizing agents into the batch materials or glass melt.

With regard to the first approach, the present inventors have identified the primary source of reducing agents in the glass batch. Zinc phosphates ($Zn_3(PO_4)_2$ and $Zn_2P_2O_7$) are typically used in glass melting as the source material of ZnO and $P_2O_5$. The present inventors have found that these materials tend to contain reducing agents detrimental to the production of metallic Te— and metallic Bi-free glass material of the present invention. The present inventors have further discovered that, by calcinating zinc phosphates in a crucible in open air at an elevated temperature around about 500° C. for a prolonged period of time, typically around about 5 hours, the reducing agents can be significantly reduced or eliminated from the batch. This could be due to one or more of several factors: (a) evaporation of the reducing agents during the calcination; (b) passivation of the color-imparting agents from the batch materials; and (c) oxidation of the reducing agents during the calcination by $O_2$ or other agents present in the calcination environment. Surprisingly, the present inventors have found that calcination of zinc phosphates can be effectively employed to produce $P_2O_5$— and $TeO_2$-containing and/or $Bi_2O_3$-containing glass of the present invention without visible coloration. This calcination approach can be applied likewise for other batch materials to reduce the amount of reducing agents therein. It is also contemplated that during the calcination of the zinc phosphates and other batch materials, oxidizing agents, such as nitrates, oxygen gas, peroxides, and the like, may be employed in order to increase the efficiency and efficacy of the calcination step in decreasing the amounts of reducing agents.

In a surprising matter, the present inventors have found that, by using phosphoric acids as the source material of $P_2O_5$ in the glass instead of zinc phosphates, essentially colorless $P_2O_5$— and $TeO_2$-containing and/or $Bi_2O_3$-containing glass can be produced. Without intending to be bound by any particular theory, the present inventors believe it is because the phosphoric acids (such as $H_3PO_4$, $H_4P_2O_7$, and the like) contain reducing agents at a much lower level. Another advantage of using phosphoric acids as the source material of $P_2O_5$ in the glass is ease of mixing the batch. Phosphoric acids typically are fluids, and can be further diluted with water if needed, thus they are easy to mix with the other batch materials, which are typically solid materials. The present inventors have found that, by using phosphoric acids as the sole $P_2O_5$ source material in the batch, glasses of the present invention that is essentially colorless (hence essentially free of visually perceptible metallic Te and Bi in the glass) can be prepared without the need of further extraordinary measure, such as the use of oxidizing agent in the batch material, or subject the batch or glass melt to enhanced oxidation, as detailed infra.

One way contemplated by the present inventors of eliminating or minimizing the presence of reducing agents form the batch material, especially from those batch materials known to have the tendency of being contaminated, is: treating a mixture of the batch material, or combination of batch materials with a an oxidizing agent (in certain embodiments advantageously including a step of heating such mixture to an elevated temperature) before melting. Oxidizing agents that can be used include, but are not limited to: nitrates ($NaNO_3$, $KNO_3$, $NH_4NO_3$, for example), peroxides (e.g., $Na_2O_2$, $K_2O_2$, $BaO_2$), chlorates and perchlorates (e.g., $NaClO_3$, $KClO_3$, $NaClO_4$, $KClO_4$), hypochorites (e.g., NaClO, KClO, HClO), bromates, persulfates (e.g., $Na_2S_2O_7$, $K_2S_2O_7$), $Br_2$, and the like, stream of air, $O_2$ gas, $O_3$ gas, $Cl_2$ gas, and the like, and any agent that upon heating to an elevated temperature can release $O_2$ or $Cl_2$). Such pre-oxidized batch materials are subsequently mixed with additional batch materials and melted to form the glass of the present invention.

As to approach (ii), the present inventors have found this approach can be implemented simply and effectively in producing colorless $P_2O_5$— and $TeO_2$-containing glass of the present invention with or without $Bi_2O_3$. Essentially, all normal batch materials, together with oxidizing agents are mixed together and subjected to melting. Oxidizing agents that may be used include, but are not limited to: nitrates (e.g., $NaNO_3$, $KNO_3$, $NH_4NO_3$), peroxides (e.g., $Na_2O_2$, $K_2O_2$, $BaO_2$), chlorates and perchlorates (e.g., $NaClO_3$, $KClO_3$), $NaClO_4$ and $KClO_4$), $Cl_2$, hypochorites (e.g., NaClO, KClO, HClO), bromates, $Br_2$, and the like, persulfates (e.g., $NaS_2O_7$, $K_2S_2O_7$), and the like, and any agent that upon heating to an elevated temperature can release $O_2$ or $Cl_2$. Alternatively or additionally, during the glass melting process, stream of air, other $O_2$-containing gas, $O_2$, $O_3$, $Cl_2$, and mixtures thereof, may be used to oxidize the batch and/or glass melt so that all metals, especially those with high tendency to be reduced by reducing agents present in the batch material under normal glass melting condition), are sufficiently oxidized. The oxidation may take various forms: (I) oxidation and/or passivation of the reducing agents; and/or (II) oxidation of any metal, especially Te and/or Bi, that has been reduced to metallic state. Further, the presence of such oxidizing agent can inhibit or prevent the reduction of metal oxides into metallic state. Among all these oxidizing agents, $NaNO_3$ and $KNO_3$ can be conveniently used if the presence of $Na_2O$ or $K_2O$ is not undesirable. If the presence of $Na_2O$ or $K_2O$ should be avoided, or $Na_2O$ and $K_2O$ will be introduced into the glass through other exclusive sources, $NH_4NO_3$ can be conveniently and effectively used as the oxidizing agent.

In practice, the above approaches (i) and (ii) may be used alone without the need of any other approach, or may be used in any combination in order to achieve the desired glass melt with desirably low level of metallic Te and/or Bi in the glass. For example, it may be desired, such as when a batch of $Zn_2P_2O_7$ or $Zn_3(PO_4)_2$ is heavily contaminated with reducing agents such as carbon, $Fe^{2+}$, and the like, that the $Zn_2P_2O_7$ or $Zn_3(PO_4)_2$ batch material is first calcined and/or oxidized, and thereafter during the glass melting process, additional oxidizing agent, such as $NH_4NO_3$ is included into the batch, in order to obtain the desired glass essentially free of metallic Te and/or Bi.

A third aspect of the present invention is directed to glass articles made of the glass of the present invention. The glass of the present invention, due to the high refractive index and low $T_g$, can be advantageously formed into various shapes suiting the needs of various applications. For example, the glass of the present invention can be pressed, molded, or otherwise shaped to spherical lenses, aspherical lenses, prisms, and the like, having a near-net shape or a net shape, for use in various optical devices. The advantage of the glass material of the present invention for making near-net shape and net-shape aspherical lenses is enormous: (a) the high refractive index leads to thin lens element with low material consumption, significantly lowering the total cost and facilitating lens group design; (b) high moldability due to low $T_g$ and long viscosity curve means that the precision optical surface of the lens elements can be obtained without the need of costly and difficult-to-control lapping and polishing step.

The following non-limiting examples further illustrate the present application. These examples are for the only purpose of illustrating the present invention as claimed, and shall not be interpreted to limit the invention as claimed in any way.

Examples

In the following examples, the compositions of the glasses are expressed on a mole percentage basis of the specified oxides of the total composition.

In the examples, $TeO_2$, $Bi_2O_3$, $NaPO_3$, $KPO_3$, $H_3PO_4$, $LiPO_3$, ZnO, $Zn_2P_2O_7$, $BaCO_3$, $SrCO_3$, $Al(PO_3)_3$, among others, were used as the batch materials.

Where $H_3PO_4$ was used as the batch material, it is mixed with other solid batch materials to form a wet batch, which is then dried at about 300° C. before melting.

Where $Zn_2P_2O_7$ is pre-calcined before being used as the batch material, the pre-calcination is conducted in a crucible at about 500° C. for about 4 hours.

All batch materials were melted in a gold crucible at a temperature of about 900-1000° C. for about 10-30 minutes. The melt was then poured onto the surface of a steel plate where it was quenched and subsequently annealed if needed.

Water durability of the glasses of the present invention was characterize in terms of percentage of weight loss after subjecting a single sample piece of glass having approximately 4 cm² surface area to boiling distilled deionized water for 4 hours. Any appreciable surface changes during or upon completion of the water durability test were recorded.

Glass transition temperature ($T_g$) and crystallization temperature ($T_x$, defined as the temperature at which the onset of crystallization when the glass is heated from about room temperature is observed) were determined by differential scanning calorimetry (DSC). Refractive index was measured at a wavelength of 633 nm by Metricon. Measurement of transmission of the glass was performed on the Cary 5G UV-Vis-NIR spectrophotometer from 300 to 2000 nm, without correction of surface reflection loss.

It has been observed that phosphotellurite glasses made from dry batches in which $Zn_2P_2O_7$ is a major component (i.e., >10% of the batch) frequently develop brown tints due to metallic Te. The following tables give examples of phosphotellurite glasses made from batches containing $H_3PO_4$, nitrates and/or purified $Zn_2P_2O_7$ that illustrate the efficacy of these constituents in decolorizing these otherwise brown glasses.

TABLE I shows examples of glasses (Example Nos. I.2, I.3, I.4, I.5 and I.6, to be specific) prepared from "wet" batches using $H_3PO_4$. Glass of Example No. I.1 was prepared from a dry batch containing $Zn_2P_2O_7$ (not calcined). As with the reference glass of Example No. I.1, glasses compositionally equivalent to Example Nos. I.2, I.3, I.4, I.5 and I.6, but made from dry batches containing non-pre-calcined $Zn_2P_2O_7$, typically have a brown tint. Replacing $Zn_2P_2O_7$ with the corresponding amount of $ZnO+H_3PO_4$ in the batch clearly enables the production of colorless (or "water-white") glass.

In TABLE II, several phosphotellurite glasses made from dry batches with and without nitrates are presented. The results demonstrate that nitrates are effective in decolorizing phosphotellurite glasses, even when large amounts of $Zn_2P_2O_7$ (not calcined) are present in the batch. Without intending to be bound by any particular theory, it is believed this is due to the oxidation effect of nitrates on the reducing impurities, if any, present in the batch materials.

As noted above, phosphotellurite glasses made from dry batches containing >10% non-pre-calcined $Zn_2P_2O_7$ essentially free of oxidizing agents such as nitrates are typically brown, suggesting that this raw material, in its as-received state, may contain impurities that are capable of reducing $Te^{4+}$ to $Te^0$.

TABLE III demonstrates that colorless phosphotellurite glass can be made from a dry, nitrate-free batch if the $Zn_2P_2O_7$ is calcined prior to melting. Without intending to be bound by any particular theory, it is believed during the calcination of $Zn_2P_2O_7$, the following may have taken place, effectively suppressing the reduction of $TeO_2$ in the glass melting process: (i) the reducing impurities present in the $Zn_2P_2O_7$ were oxidized by oxygen present in the open air in which the calcination took place; (ii) the reducing impurities disintegrated during calcination, and as a result loses ability to reduce $TeO_2$ in the glass melting process; (iii) the reducing impurities evaporated during calcination; and (iv) the reducing impurities were otherwise passified during the calcination.

In TABLE IV, more examples of a range of phosphotellurite glass compositions (mol %) are given.

As a typical press molding viscosity is ~$3 \times 10^9$ poise, many of the inventive glasses should be moldable at temperatures between 370 and 385° C.

Figure 3:
FIG. 3 is a diagram showing the $T_g$ and weight loss of a series of $TeO_2$—, ZnO— and $P_2O_5$-containing glass having a general formula of $xNa_2O.(40-x)ZnO.20P_2O_5.40TeO_2$.
Figure 3:
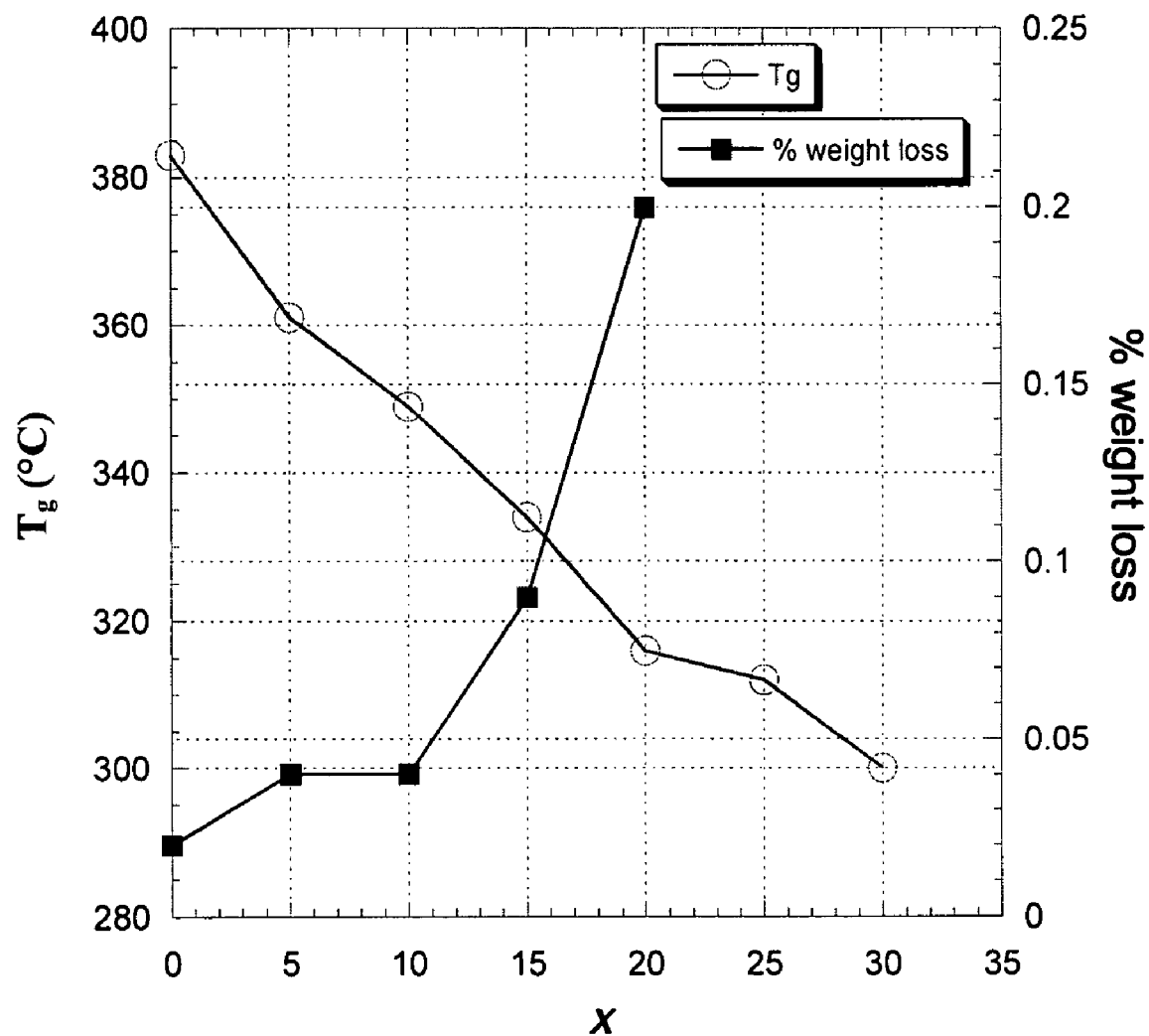
Figure 4:
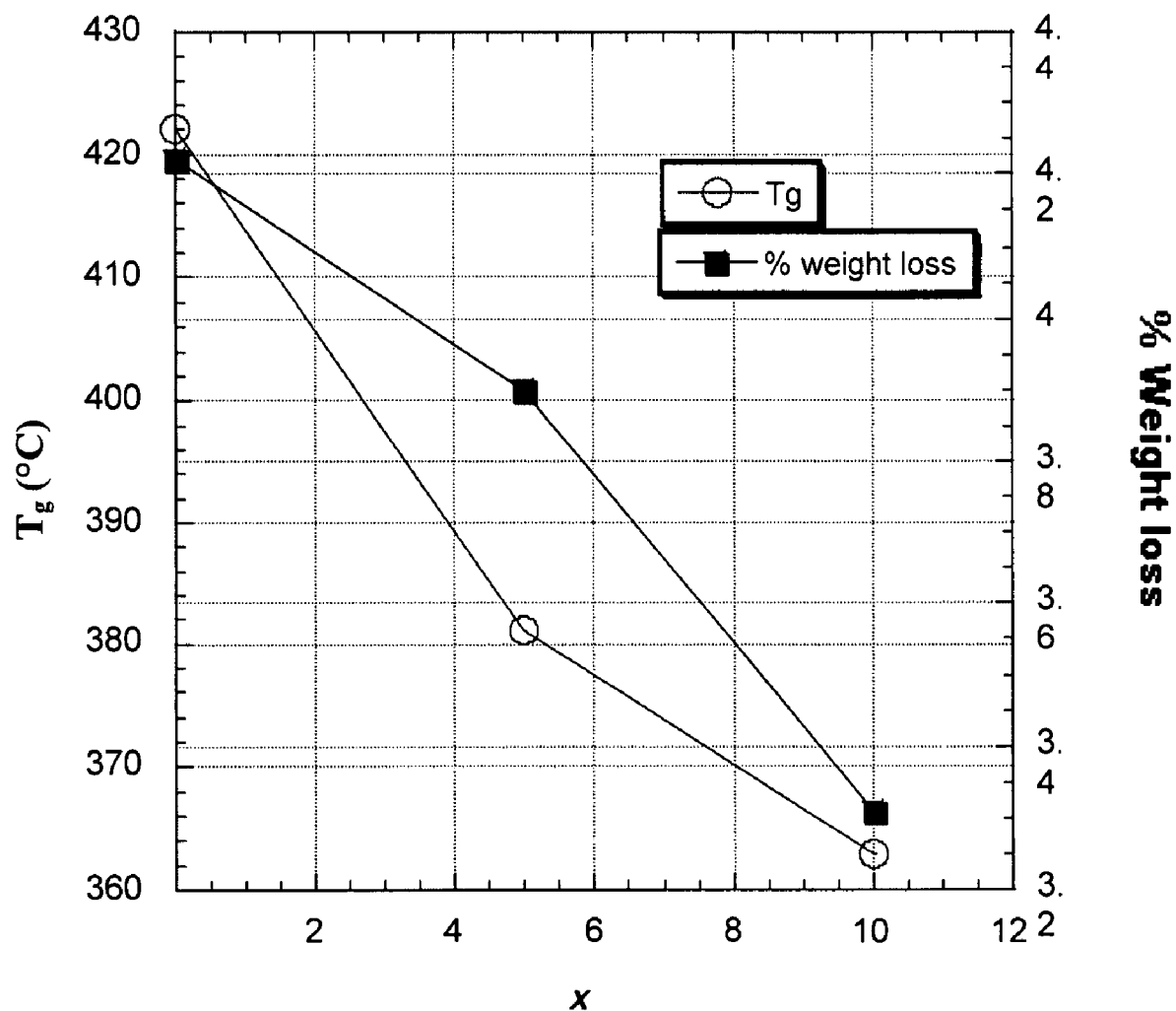
FIG. 4 is a diagram showing the $T_g$ and weight loss of a series of $TeO_2$—, BaO— and $P_2O_5$-containing glass having a general formula of $xNa_2O.(30-x)BaO.30P_2O_5.40TeO_2$.
Figure 5:
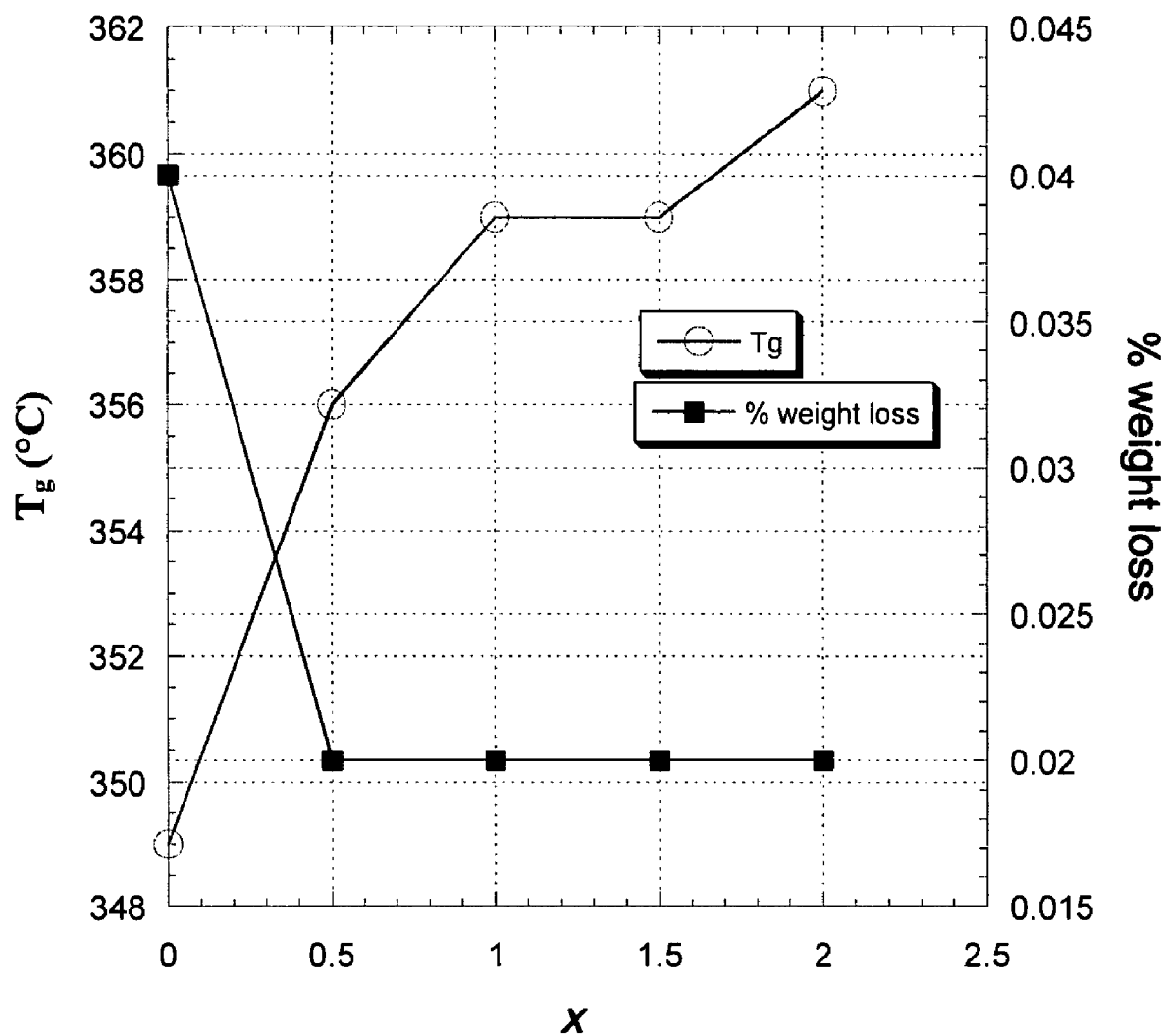
FIG. 5 is a diagram showing the $T_g$ and weight loss of a series of $TeO_2$—, ZnO—, and $P_2O_5$-containing glasses having a general formula of $xAl_2O_3.(30-x)ZnO.20P_2O_5.40TeO_2$.

The present inventors further investigated a series of glass families to study the relationship between the glass compositions and the important physical properties, especially $T_g$, water durability, refractive index, and the like. Compositions of the glasses investigated are listed in TABLES V-VIII. The properties investigated of those glass samples are indicated in FIGS. 3-5.

The present inventors also prepared a plurality of $TeO_2$— and $Bi_2O_3$-containing glasses. The composition and important properties are listed in TABLE IX.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

TABLE I

| | Example No. | | | | | |
| --- | --- | --- | --- | --- | --- | --- |
| | I.1 | I.2 | I.3 | I.4 | I.5 | I.6 |
| $Na_2O$ | 12 | 12 | 12 | 10 | 10 | 10 |
| BaO | 0 | 0 | 0 | 0 | 8 | 5 |
| $Al_2O_3$ | 0 | 0 | 1.2 | 0 | 0 | 0 |
| ZnO | 28 | 28 | 27 | 23 | 25 | 15 |
| $P_2O_5$ | 20 | 20 | 19.8 | 17 | 17 | 10 |
| $TeO_2$ | 40 | 40 | 40 | 50 | 40 | 60 |
| Color | Pale brown | Colorless | Colorless | Colorless | Colorless | Colorless |
| $T_g$ (° C.) | 345 | 350 | 351 | 350 | 361 | 333 |

TABLE I-continued

|  | Example No. |  |  |  |  |  |
|---|---|---|---|---|---|---|
|  | I.1 | I.2 | I.3 | I.4 | I.5 | I.6 |
| $T_x - T_g$ (° C.) | 138 | ND | ND | 191 | 117 | 118 |
| n @ 633 nm | 1.784 | 1.797 | 1.778 | 1.847 | ND* | ND |
| Weight loss (%) | 0.22 | 0.07 | 0.06 | 0.26 | 0.04 | 0.17 |

Notes:
In all TABLEs I-VIII:
*ND: Not Determined

TABLE II

|  |  | Example No. |  |  |  |  |  |
|---|---|---|---|---|---|---|---|
|  |  | II.1 | II.2 | II.3 | II.4 | II.5 | II.6 |
| $Na_2O$ |  | 10 | 10 | 10 | 10 | 10 | 10 |
| BaO |  | 8 | 8 | 0 | 0 | 0 | 0 |
| SrO |  | 0 | 0 | 0 | 0 | 8 | 8 |
| ZnO |  | 25 | 25 | 33 | 33 | 25 | 25 |
| $P_2O_5$ |  | 27 | 27 | 17 | 17 | 17 | 17 |
| $TeO_2$ |  | 30 | 30 | 40 | 40 | 40 | 40 |
| Batch | $NaPO_3$ | 3.57 | 2.97 | 3.77 | 3.51 | 3.70 | 3.46 |
| materials | $NaNO_3$ | 0 | 0.49 | 0 | 0.22 | 0 | 0.20 |
| (g) | $Ba(PO_3)_2$ | 4.64 | 4.64 | 0 | 0 | 0 | 0 |
|  | $SrCO_3$ | 0 | 0 | 0 | 0 | 2.43 | 2.43 |
|  | ZnO | 0.55 | 0.10 | 2.79 | 2.59 | 1.41 | 1.23 |
|  | $Zn_2P_2O_7$ | 7.48 | 8.44 | 5.88 | 6.30 | 5.81 | 6.21 |
|  | $TeO_2$ | 9.58 | 9.58 | 13.19 | 13.19 | 13.00 | 13.00 |
| Color |  | Pale brown | Colorless | Dark brown | Colorless | Pale brown | Colorless |
| $T_g$ (° C.) |  | 364 | 359 | 355 | 347 | ND | 354 |
| $T_x - T_g$ (° C.) |  | 156 | 156 | 102 | 111 | ND | 140 |
| Weight loss (%) |  | ND | 0.09 | 0.05 | 0.09 | 0.02 | 0.06 |

TABLE III

|  | $Zn_2P_2O_7$ |  | Composition |  |  |  |
|---|---|---|---|---|---|---|
| Example No. | In batch | Color | $Na_2O$ | ZnO | $P_2O_5$ | $TeO_2$ |
| III.1 | As received | Pale brown | 12 | 28 | 20 | 40 |
| III.2 | Calcined | Colorless |  |  |  |  |

TABLE IV

|  | Example No. |  |  |  |  |  |  |  |  |  |  |  |
|---|---|---|---|---|---|---|---|---|---|---|---|---|
|  | IV.1 | IV.2 | IV.3 | IV.4 | IV.5 | IV.6 | IV.7 | IV.8 | IV.9 | IV.10 | IV.11 | IV.12 |
| $Na_2O$ | 4 | 6 | 8 | 10 | 12 | 8 | 10 | 12 | 14 | 4 | 12 | 16 |
| ZnO | 9.33 | 14 | 18.67 | 23.33 | 28 | 18 | 22.5 | 27 | 31.5 | 21 | 33 | 39 |
| $Al_2O_3$ | 0 | 0 | 0 | 0 | 0 | 0.8 | 1 | 1.2 | 1.4 | 0 | 0 | 0 |
| BaO | 0 | 0 | 0 | 0 | 0 | 0 | 0 | 0 | 0 | 12 | 6 | 3 |
| $P_2O_5$ | 6.67 | 10 | 13.33 | 16.67 | 20 | 13.2 | 16.5 | 19.8 | 23.1 | 7 | 21 | 28 |
| $TeO_2$ | 80 | 70 | 60 | 50 | 40 | 60 | 50 | 40 | 30 | 56 | 28 | 14 |
| $T_g$ (° C.) | 324 | 331 | 338 | 341 | 345 | 335 | 345 | 349 | 352 | ND | ND | ND |
| n @ 633 nm | ND | ND | ND | 1.848 | 1.784 | 1.92 | 1.85 | 1.780 | ND | ND | ND | ND |
| Color | Colorless | Colorless | Brown | Brown | Brown | Colorless | Brown | Brown | Brown | Colorless | Brown | Colorless |

TABLE V $xR_2O \bullet (40 - x)ZnO \bullet 20P_2O_5 \bullet 40TeO_2$ Glass System

| | Example No. | | | | | | | | | |
|---|---|---|---|---|---|---|---|---|---|---|
| | V.1 | V.2 | V.3 | V.4 | V.5 | V.6 | V.7 | V.8 | V.9 | V.10 |
| $Na_2O$ | 0 | 5 | 10 | 15 | 20 | 0 | 0 | 4 | 2 | 6 |
| $Li_2O$ | 0 | 0 | 0 | 0 | 0 | 0 | 0 | 4 | 2 | 6 |
| $K_2O$ | 0 | 0 | 0 | 0 | 0 | 10 | 15 | 2 | 1 | 3 |
| ZnO (40 − x) | 40 | 35 | 30 | 25 | 20 | 30 | 25 | 30 | 35 | 25 |
| $P_2O_5$ | 20 | 20 | 20 | 20 | 20 | 20 | 20 | 20 | 20 | 20 |
| $TeO_2$ | 40 | 40 | 40 | 40 | 40 | 40 | 40 | 40 | 40 | 40 |
| $T_g$ (° C.) | 383 | 361 | 349 | ND | ND | 362 | ND | 337 | 356 | 321 |
| $T_x - T_g$ (° C.) | 148 | ND | ND | ND | ND | 115 | ND | 123 | ND | 129 |
| weight loss (%) | 0.22 | 0.04 | 0.04 | 0.09 | 0.22 | 0.03 | ND | 0.03 | 0.00 | 0.06 |
| Appearance** | U | SH | H | H | H | H | ND | U | U | H |

Notes:

In all TABLEs V-VIII:

**"Appearance" here means appearance of the glass upon completion of the water durability test by subjecting sample glass pieces to boiling deionized distilled water for 4 hours. The codes used have the following meaning:

U: Surface appearance is unaffected.

SH: Surface becomes slightly hazy.

H: Surface becomes hazy.

W: Surface becomes white (translucent or opaque).

TABLE VI $10Na_2O \bullet (30 - x)ZnO \bullet 20P_2O_5 \bullet 40TeO_2$ Glass System***

| | Example No. | | | | | | | |
|---|---|---|---|---|---|---|---|---|
| | VI.1 | VI.2 | VI.3 | VI.4 | VI.5 | VI.6 | VI.7 | VI.8 |
| $Na_2O$ | 10 | 10 | 10 | 10 | 10 | 10 | 10 | 10 |
| $Al_2O_3$ | 0 | 0.5 | 1 | 1.5 | 2 | 0 | 0 | 0 |
| BaO | 0 | 0 | 0 | 0 | 0 | 5 | 0 | 0 |
| SrO | 0 | 0 | 0 | 0 | 0 | 0 | 5 | 0 |
| $B_2O_3$ | 0 | 0 | 0 | 0 | 0 | 0 | 0 | 5 |
| ZnO (30 − x) | 30 | 29.5 | 29 | 28.5 | 28 | 25 | 25 | 25 |
| $P_2O_5$ | 20 | 20 | 20 | 20 | 20 | 20 | 20 | 20 |
| $TeO_2$ | 40 | 40 | 40 | 40 | 40 | 40 | 40 | 40 |
| $T_g$ (° C.) | 349 | ND | ND | ND | 361 | 354 | 354 | 361 |
| $T_x - T_g$ (° C.) | ND | ND | ND | ND | 111 | ND | ND | ND |
| Weight loss (%) | 0.04 | 0.02 | 0.03 | 0.02 | 0.03 | 0.00 | 0.03 | 0.04 |
| Appearance | H | H | SH | SH | U | SH | SH | H |

Notes:

***In this TABLE VI, x denotes the mole percentages of $Al_2O_3$, BaO, SrO and $B_2O_3$ in total.

TABLE VII $xNa_2O \bullet yZnO \bullet (60 - x - y)P_2O_5 \bullet 40TeO_2$ Glass System

| | Example No. | | | | | | | | |
|---|---|---|---|---|---|---|---|---|---|
| | VII.1 | VII.2 | VII.3 | VII.4 | VII.5 | VII.6 | VII.7 | VII.8 | VII.9 |
| $Na_2O$ (x) | 0 | 0 | 0 | 5 | 5 | 10 | 20 | 8 | 6 |
| $P_2O_5$ (60 − x − y) | 20 | 15 | 10 | 15 | 20 | 20 | 20 | 18 | 22 |
| ZnO (y) | 40 | 45 | 50 | 40 | 35 | 30 | 25 | 34 | 32 |
| $TeO_2$ | 40 | 40 | 40 | 40 | 40 | 40 | 40 | 40 | 40 |
| $T_g$ (° C.) | 383 | 385 | ND | 371 | 361 | 349 | 316 | 356 | 357 |
| $T_x - T_g$ (° C.) | 148 | 155 | 105 | ND | ND | ND | 131 | ND | ND |
| Weight loss (%) | 0.20 | 0.00 | 0.01 | 0.02 | 0.04 | 0.04 | 0.22 | 0.02 | 0.06 |
| Appearance | U | U | U | SH | H | H | H | H | H |

TABLE VIII $x\text{Na}_2\text{O} \cdot y\text{BaO} \cdot (60 - x - y)\text{P}_2\text{O}_5 \cdot 40\text{TeO}_2$ Glass System

| | Example No. | | | |
|---|---|---|---|---|
| | VIII. 1 | VIII. 2 | VIII. 3 | VIII. 4 |
| $\text{Na}_2\text{O}$ (x) | 0 | 5 | 10 | 15 |
| BaO (y) | 30 | 25 | 20 | 20 |
| $\text{P}_2\text{O}_5$ (60 − x − y) | 30 | 30 | 30 | 25 |
| $\text{TeO}_2$ | 40 | 40 | 40 | 40 |
| $T_g$ (° C.) | 422 | 381 | 363 | ND |
| $T_x - T_g$ (° C.) | ND | ND | ND | ND |
| Weight loss (%) | 4.22 | 3.31 | 6.42 | 3.01 |
| Appearance | W | W | W | W |

TABLE IX $\text{Bi}_2\text{O}_3$-containing Glass

| | Example No. | | | | | | | | | |
|---|---|---|---|---|---|---|---|---|---|---|
| | IX.1 | IX.2 | IX.3 | IX.4 | IX.5 | IX.6 | IX.7 | IX.8 | IX.9 | IX.10 |
| $\text{Na}_2\text{O}$ | 10 | 10 | 10 | 10 | 10 | 10 | 10 | 10 | 10 | 10 |
| ZnO | 26.5 | 34 | 36.5 | 37 | 31.5 | 37 | 37 | 37 | 38 | 35 |
| $\text{Al}_2\text{O}_3$ | 1 | 1 | 1 | 1 | 1 | 1 | 1 | 1 | — | — |
| $\text{Bi}_2\text{O}_3$ | 2.5 | 5 | 7.5 | 8 | 2.5 | 8 | 8 | 8 | 8 | 5 |
| $\text{P}_2\text{O}_5$ | 20 | 25 | 27.5 | 28 | 22.5 | 25 | 22 | 19 | 22 | 25 |
| $\text{TeO}_2$ | 40 | 25 | 17.5 | 16 | 32.5 | 19 | 22 | 25 | 22 | 25 |
| $T_g$ (° C.) | 355 | 367 | 370 | 373 | 361 | 373 | 375 | 375 | | |
| n @ 633 nm | ND | 1.767 | 1.762 | 1.759 | 1.776 | 1.786 | 1.802 | 1.822 | 1.806 | 1.769 |
| wt % of $\text{TeO}_2$ | 48.1 | 29.8 | 20.1 | 18.2 | 40.4 | 21.6 | 24.9 | 28.2 | 24.9 | 29.9 |

What is claimed is:

1. A glass material having a refractive index higher than about 1.70 at 633 nm, having a composition, expressed in mole percentage of the total composition on an oxide basis, wherein the oxides comprise oxides of metal elements, tellurium, bismuth, gallium, and phosphorus, comprising: 20-90% $\text{TeO}_2$; 17-40% $\text{P}_2\text{O}_5$; 1-30% $\text{R}_2\text{O}$, where $\text{R}_2\text{O}$ represents $\text{Na}_2\text{O}$ and, optionally, at least one of $\text{K}_2\text{O}$, $\text{Rb}_2\text{O}$, and $\text{Cs}_2\text{O}$; 0-30% RO, where RO represents all alkaline earth metal oxides in total; 5-40% ZnO; 0-15% $\text{Bi}_2\text{O}_3$; 0.5-5% $\text{Al}_2\text{O}_3$; 0-5% $\text{Ga}_2\text{O}_3$; 0.5-15 $\text{R}_2\text{O}_3$, where $\text{R}_2\text{O}_3$ represents $\text{Al}_2\text{O}_3$, $\text{Bi}_2\text{O}_3$ and $\text{Ga}_2\text{O}_3$ in total; 0-5% $\text{Ln}_2\text{O}_3$, where Ln is any metal selected from the group consisting of lanthanoids, Y and Sc; 0-20% $\text{Tl}_2\text{O}$; and 0-30% CdO, and wherein the glass material is free of $\text{Li}_2\text{O}$ and PbO.

2. A glass material according to claim 1 which is free of $\text{Bi}_2\text{O}_3$ and comprises about 0.5-3% $\text{Al}_2\text{O}_3$ and $\text{Ga}_2\text{O}_3$.

3. A glass material according to claim 1 which is free of $\text{Bi}_2\text{O}_3$ and comprises about 0.5-3% $\text{Al}_2\text{O}_3$.

4. A glass material according to claim 1 comprising about 5-15% of $\text{Bi}_2\text{O}_3$.

5. A glass material according to claim 4, comprising about 10-15% of $\text{Bi}_2\text{O}_3$, and free of $\text{Ga}_2\text{O}_3$.

6. A glass material according to claim 1 having a composition, expressed in mole percentages of the total compositions on an oxide basis, consisting essentially of: 25-70% $\text{TeO}_2$; 17-25% $\text{P}_2\text{O}_5$; 1-25% $\text{R}_2\text{O}$, where $\text{R}_2\text{O}$ represents $\text{Na}_2\text{O}$ and, optionally, at least one of $\text{K}_2\text{O}$, $\text{Rb}_2\text{O}$, and $\text{Cs}_2\text{O}$; 0-20% RO, where RO represents all alkaline earth metal oxides in total; 10-35% ZnO; 0-10% $\text{Bi}_2\text{O}_3$; 0.5-3% $\text{Al}_2\text{O}_3$; 0-3% $\text{Ga}_2\text{O}_3$; 0.5-15 $\text{R}_2\text{O}_3$, where $\text{R}_2\text{O}_3$ represents $\text{Al}_2\text{O}_3$, $\text{Bi}_2\text{O}_3$ and $\text{Ga}_2\text{O}_3$ in total; 0-2% $\text{Ln}_2\text{O}_3$, Ln is any metal selected from the group consisting of lanthanoids, Y and Sc; and is free of $\text{Li}_2\text{O}$, PbO, CdO and $\text{Tl}_2\text{O}$.

7. A glass material according to claim 1, which is essentially colorless.

8. A glass material according to claim 1, which has a $T_g$ of lower than about 400° C.

9. A glass material according to claim 1 which is free of metals in a metallic state.

10. A glass material according to claim 1, wherein the metal elements comprised therein are at the highest valency.

11. A glass material according to claim 1, having a water durability of less than 0.5% weight loss.

12. A process for making a glass comprising $\text{TeO}_2$ and $\text{P}_2\text{O}_5$, wherein:

the source material of $\text{P}_2\text{O}_5$ in the batch is selected from: (i) $\text{H}_3\text{PO}_4$, $\text{H}_4\text{P}_2\text{O}_7$, $\text{P}_2\text{O}_5$, metal phosphates, (ii) solutions and/or dispersions of those listed in (i); and (iii) mixtures and combinations of those listed in (i) and (ii); and the batch materials are selected such that upon melting, the glass has a refractive index higher than about 1.70 at 633 nm, and a composition, expressed in mole percentage of the total composition on an oxide basis, comprising: 20-90% $\text{TeO}_2$; 17-40% $\text{P}_2\text{O}_5$; 1-30% $\text{R}_2\text{O}$, where $\text{R}_2\text{O}$ represents $\text{Na}_2\text{O}$ and, optionally, at least one of $\text{K}_2\text{O}$, $\text{Rb}_2\text{O}$ and $\text{Cs}_2\text{O}$; 0-30% RO, where RO represents all alkali earth metal oxides in total; 5-40% ZnO; 0-15% $\text{Bi}_2\text{O}_3$; 0.5-5% $\text{Al}_2\text{O}_3$; 0-5% $\text{Ga}_2\text{O}_3$; 0.5-15 $\text{R}_2\text{O}_3$, where $\text{R}_2\text{O}_3$ represents $\text{Al}_2\text{O}_3$, $\text{Bi}_2\text{O}_3$ and $\text{Ga}_2\text{O}_3$ in total; 0-5% $\text{Ln}_2\text{O}_3$, where Ln is any metal selected from the group consisting of lanthanoids, Y and Sc; 0-20% $\text{Tl}_2\text{O}$; and 0-30% CdO, and wherein the glass material is free of $\text{Li}_2\text{O}$ and PbO.

13. A process according to claim 12, wherein the source material of $\text{P}_2\text{O}_5$ in the batch is essentially free of reducing impurities.

14. A process according to claim 13, comprising a step of calcining the solid source material of $\text{P}_2\text{O}_5$ in the batch at an elevated temperature before mixing such material with the rest of the batch material.

15. A process according to claim 12, wherein an oxidizing agent is included in the batch material.

16. A process according to claim 15, wherein the oxidizing agent is selected from nitrates, peroxides, perchlorates, chlorates, perchlorates, persulfates, oxidizing gases, and combinations and mixtures thereof.

17. A glass article comprising a glass material having a refractive index higher than about 1.70 at 633 nm, having a composition, expressed in mole percentage of the total composition on an oxide basis, comprising: 20-90% $TeO_2$; 17-40% $P_2O_5$; 1-30% $R_2O$, where $R_2O$ represents $Na_2O$ and, optionally, at least one of $K_2O$, $Rb_2O$, and $Cs_2O$; 0-30% RO, where RO represents all alkaline earth metal oxides in total; 5-40% ZnO; 0-15% $Bi_2O_3$; 0.5-5% $Al_2O_3$; 0-5% $Ga_2O_3$; 0.5-15 $R_2O_3$ where $R_2O_3$ represents $Al_2O_3$, $Bi_2O_3$ and $Ga_2O_3$ in total; 0-5% $Ln_2O_3$, where Ln is any metal selected from the group consisting of lanthanoids, Y and Sc; 0-20% $Tl_2O$; and 0-30% CdO, and wherein the glass material is free of $Li_2O$ and PbO.

18. An article according to claim 17, which is a refractive lens element for use in an optical device.

19. An article according to claim 17, which is an aspherical lens element for use in an optical device.

20. An article according to claim 17, wherein the glass is essentially colorless.

21. An article according to claim 17, wherein the glass has a $T_g$ of lower than about 400° C.

22. An article according to claim 17, wherein the glass has a water durability of less than 0.5% weight loss.

* * * * *